(12) United States Patent
Li et al.

(10) Patent No.: US 9,897,735 B2
(45) Date of Patent: *Feb. 20, 2018

(54) WIRE GRID POLARIZER AND FABRICATION METHOD THEREOF, AND DISPLAY DEVICE

(71) Applicant: BOE TECHNOLOGY GROUP CO., LTD., Beijing (CN)

(72) Inventors: Yingyi Li, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/324,392

(22) PCT Filed: Mar. 4, 2015

(86) PCT No.: PCT/CN2015/073641
§ 371 (c)(1),
(2) Date: Jan. 6, 2017

(87) PCT Pub. No.: WO2016/058314
PCT Pub. Date: Apr. 21, 2016

(65) Prior Publication Data
US 2017/0205551 A1    Jul. 20, 2017

(30) Foreign Application Priority Data

Oct. 17, 2014 (CN) .......................... 2014 1 0554865

(51) Int. Cl.
*G02B 5/30* (2006.01)
*B29D 11/00* (2006.01)
(Continued)

(52) U.S. Cl.
CPC ...... *G02B 5/3058* (2013.01); *B29D 11/00644* (2013.01); *G02F 1/133528* (2013.01);
(Continued)

(58) Field of Classification Search
CPC ............ G02B 5/3058; B29D 11/00644; B29K 2001/12; B29K 2067/003; G02F 1/133528; G02F 2001/133548
(Continued)

(56) References Cited

U.S. PATENT DOCUMENTS 7,605,833 B2    10/2009  Yamaki
7,605,883 B2 *  10/2009  Yamaki ............... G02B 5/3058
                                                           349/96
(Continued)

FOREIGN PATENT DOCUMENTS

CN    1737615 A    2/2006
CN    1952700 A    4/2007
(Continued)

OTHER PUBLICATIONS

Machine Translation of JP 2006-184624 from https://www.j-platpat.inpit.go.jp/web/all/top/BTmTopEnglishPage performed on May 25, 2017.*
(Continued)

*Primary Examiner* — Frank Font
(74) *Attorney, Agent, or Firm* — Dilworth & Barrese, LLP.; Michael J. Musella, Esq.

(57) ABSTRACT

A wire grid polarizer (20) and a fabrication method thereof, and a display device are provided. The fabrication method of the wire grid polarizer (20) includes: applying a mixture (100) including a polymeric monomer (101) and a metal particle (102) on a surface of a base substrate (01); performing a curing treatment on the mixture (100) at a predetermined position; and forming a wire grid pattern including
(Continued)

protrusions (110) arranged at intervals on the surface of the base substrate (01). Problems of a complicated process, great difficulty and high cost in a fabrication process of the wire grid polarizer (20) are solved.

11 Claims, 3 Drawing Sheets

(51) Int. Cl.
*G02F 1/1335* (2006.01)
*B29K 1/00* (2006.01)
*B29K 67/00* (2006.01)

(52) U.S. Cl.
CPC .... *B29K 2001/12* (2013.01); *B29K 2067/003* (2013.01); *G02F 2001/133548* (2013.01)

(58) Field of Classification Search
USPC .......................... 359/485.05, 487.03; 349/96
See application file for complete search history.

(56) References Cited

U.S. PATENT DOCUMENTS

| | | | |
|---|---|---|---|
| 8,623,161 B2 | 1/2014 | Kaida | |
| RE45,642 E * | 8/2015 | Takada | G02B 5/3058 |
| 2007/0159577 A1 | 7/2007 | Atsushi | |
| 2007/0242187 A1 * | 10/2007 | Yamaki | G02B 5/3058 |
| | | | 349/96 |
| 2008/0118660 A1 | 5/2008 | Choi | |
| 2008/0186576 A1 * | 8/2008 | Takada | G02B 5/3025 |
| | | | 359/487.03 |
| 2008/0303986 A1 * | 12/2008 | Yamaki | G02B 5/3058 |
| | | | 349/96 |
| 2009/0067047 A1 | 3/2009 | Ueda et al. | |
| 2011/0080640 A1 | 4/2011 | Kaida et al. | |
| 2011/0096396 A1 * | 4/2011 | Kaida | C23C 14/024 |
| | | | 359/492.01 |
| 2012/0164317 A1 | 6/2012 | Kim et al. | |
| 2012/0168065 A1 | 7/2012 | Kaida | |
| 2012/0236410 A1 | 9/2012 | Akita et al. | |
| 2013/0040052 A1 * | 2/2013 | Akita | C23C 14/0021 |
| | | | 427/163.1 |
| 2014/0211316 A1 | 7/2014 | Furui et al. | |
| 2014/0293142 A1 * | 10/2014 | Kawazu | G03B 21/14 |
| | | | 349/5 |
| 2015/0227230 A1 * | 8/2015 | Cok | G06F 3/044 |
| | | | 345/174 |
| 2016/0341861 A1 * | 11/2016 | Li | B29D 11/00644 |

FOREIGN PATENT DOCUMENTS

| | | | | |
|---|---|---|---|---|
| CN | 101116018 A | | 1/2008 | |
| CN | 101354458 A | | 1/2009 | |
| CN | 101416083 A | | 4/2009 | |
| CN | 101419298 A | | 4/2009 | |
| CN | 101548206 A | | 9/2009 | |
| CN | 101900841 A | | 12/2010 | |
| CN | 101981479 A | | 2/2011 | |
| CN | 102087377 A | | 6/2011 | |
| CN | 102096134 A | | 6/2011 | |
| CN | 102308234 A | | 1/2012 | |
| CN | 102540306 A | | 7/2012 | |
| CN | 102576107 A | | 7/2012 | |
| CN | 202433543 U | | 9/2012 | |
| CN | 102713697 A | | 10/2012 | |
| CN | 102914901 A | | 2/2013 | |
| CN | 103998956 A | | 8/2014 | |
| CN | 104297835 A | * | 1/2015 | ........... G02F 1/1335 |
| CN | 104459865 A | | 3/2015 | |
| CN | 104483733 A | | 4/2015 | |
| EP | 1775607 A1 | * | 4/2007 | ........... G02B 5/3058 |
| EP | 2023169 A1 | | 11/2009 | |
| JP | 2006184624 A | * | 7/2006 | ............... G02B 5/30 |
| JP | 2007017641 A | | 1/2007 | |
| JP | 2007121507 A | | 5/2007 | |
| JP | 2008145581 A | | 6/2008 | |
| JP | 2010266483 A | | 11/2010 | |
| JP | 2011221412 A | * | 11/2011 | ............... G02B 5/30 |
| JP | 20121683031 A | | 9/2012 | |
| KR | 20080057063 A | | 6/2008 | |
| KR | 20100035347 A | | 4/2010 | |
| WO | 2007116972 A1 | | 10/2007 | |
| WO | WO 2007116972 A1 | * | 10/2007 | ............ B82Y 10/00 |
| WO | 2010126110 A1 | | 11/2010 | |
| WO | WO 2010126110 A1 | * | 11/2010 | ........... G02B 5/3058 |

OTHER PUBLICATIONS

Search Report and Written Opinion dated May 29, 2015 from State Intellectual Property Office of the P.R. China.
First Chinese Office Action dated Feb. 3, 2016.
Second Chinese Office Action dated Jul. 12, 2016.
Requirement Restriction issued in U.S. Appl. No. 14/893,703, dated Apr. 11, 2017.
Office Action issued in U.S. Appl. No. 14/890,782 dated Dec. 13, 2016.
Final Office Action issued in U.S. Appl. No. 14/890,782 dated May 23, 2017.
U.S. Office Action dated Dec. 13, 2017.
Office Action dated Dec. 19, 2017.

* cited by examiner

WIRE GRID POLARIZER AND FABRICATION METHOD THEREOF, AND DISPLAY DEVICE

CROSS-REFERENCE TO RELATED APPLICATIONS

The present application claims priority of Chinese Patent Application No. 201410554865.2 filed on Oct. 17, 2014, the disclosure of which is incorporated herein by reference in its entirety as part of the present application.

TECHNICAL FIELD

At least one embodiment of the present disclosure relates to a wire grid polarizer and a fabrication method thereof, and a display device.

BACKGROUND

Thin Film Transistor Liquid Crystal Display (TFT-LCD), as a flat-panel display device, is more frequently applied to high-performance display field, due to its characteristics such as small size, low power consumption, no radiation and relatively low fabrication cost.

A TFT-LCD, as shown in FIG. 1a, comprises an array substrate 10 and a color filter substrate 11. A liquid crystal layer 12 is filled between the array substrate 10 and the color filter substrate 11. In addition, a first polarizer 13 is provided on an upper surface of the color filter substrate 11, and a second polarizer 15 is provided between the array substrate 10 and a backlight module 14, and an optical axis of the first polarizer 13 and an optical axis of the second polarizer 15 are perpendicular to each other. In the case that no electric field is applied to the liquid crystal layer 12, light emitted from the backlight module 14 is incident on the liquid crystal layer 12 through the second polarizer 15, the light is rotated by the liquid crystal molecules of the liquid crystal layer 12 during traveling through the liquid crystal layer 12, and then the light is emitted from the first polarizer 13. In the case that an electric field is applied to the liquid crystal layer, an arrangement direction of the liquid crystal molecules in the liquid crystal layer 12 changes, so that the incident light cannot pass through the TFT-LCD. In this way, intensity of light emitted from the TFT-LCD can be controlled. In addition, under a filtering effect of the color filter substrate 11, color image display can be implemented.

In the case shown in FIG. 1a, the above-described polarizers (the first polarizer 13 and the second polarizer 14) may be made of a polyvinyl alcohol (PVA) film. The polarizer allows one polarization component in natural light to transmit, while the other polarization component is absorbed by the polarizer. As a result, a lot of light loss will be caused, so that utilization of the light from the backlight module 14 is greatly reduced.

In order to solve the above-described problem, a wire grid polarizer 20 made of a metal material is employed, as shown in FIG. 1b. In the case that light is incident on the wire grid polarizer 20, under an oscillatory action of free electrons on a surface of the metal wire grid polarizer 20, almost all light having an electric field vector component parallel to the wire grid is reflected, and almost all light having an electric field vector component perpendicular to the wire grid is transmitted. In addition, the light reflected by the wire grid polarizer 20 can be reused. Thus, the utilization of light is effectively improved.

However, in a process of fabricating the above-described metal wire grid polarizer 20, it is necessary to form a metal layer by using a metal target material, and it is also necessary to pattern the metal layer to form the pattern of the wire grid polarizer 20 by a relatively highly accurate etching process. Therefore, the fabrication process thereof is complicated, with great processing difficulty and high fabrication cost.

SUMMARY

Embodiments of the present disclosure provide a wire grid polarizer and a fabrication method thereof, and a display device, to solve problems of a complicated process, great difficulty and high cost in a fabrication process of the wire grid polarizer.

According to one aspect of the embodiments of the present disclosure, there is provided a fabrication method of a wire grid polarizer, comprising: applying a mixture including a polymeric monomer and a metal particle on a surface of a base substrate; performing a curing treatment on the mixture at a predetermined position; and forming a wire grid pattern including protrusions arranged at intervals on the surface of the base substrate.

According to another aspect of the embodiments of the present disclosure, there is provided a wire grid polarizer, comprising: a base substrate; and protrusions arranged at intervals on a surface of the base substrate; and the protrusion including a resin material doped with a metal particle.

According to still another aspect of the embodiments of the present disclosure, there is provided a display device, comprising the wire grid polarizer as described above.

BRIEF DESCRIPTION OF THE DRAWINGS

In order to more clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

REFERENCE SIGNS

01—base substrate; 10—array substrate; 11—color filter substrate; 12—liquid crystal layer; 13—first polarizer; 14—backlight module; 15—second polarizer; 20—wire grid polarizer; 100—mixture; 101—polymeric monomer; 102— metal particle; 110—protrusion; 201—mask; A—light-transmissive region of mask; B—light-shielding region of mask; 202—stamping die.

DETAILED DESCRIPTION

In order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments in the present disclosure, those skilled in the art can obtain other embodiment(s), without any inventive work, which should be within the scope of the present disclosure.

Figure 1A:
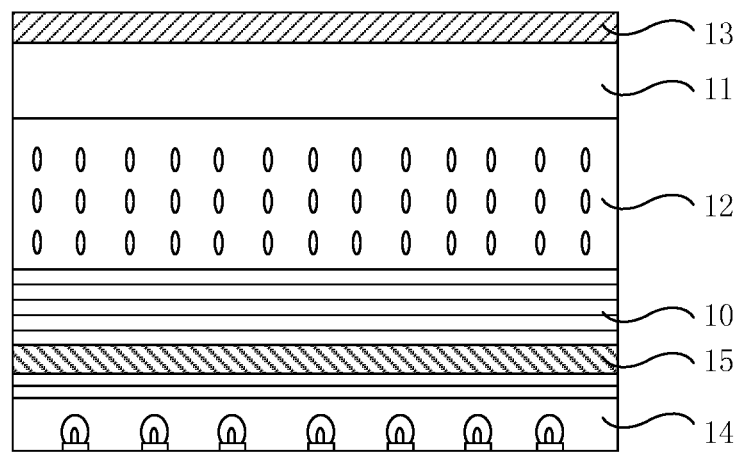
FIG. 1a is a structural schematic view of a display device.

In the case shown in FIG. 1*a*, the above-described polarizers (the first polarizer 13 and the second polarizer 14) may be made of a polyvinyl alcohol (PVA) film. The polarizer allows one polarization component in natural light to transmit, while the other polarization component is absorbed by the polarizer. As a result, a lot of light loss will be caused, so that utilization of the light from the backlight module 14 is greatly reduced.

Figure 1B:
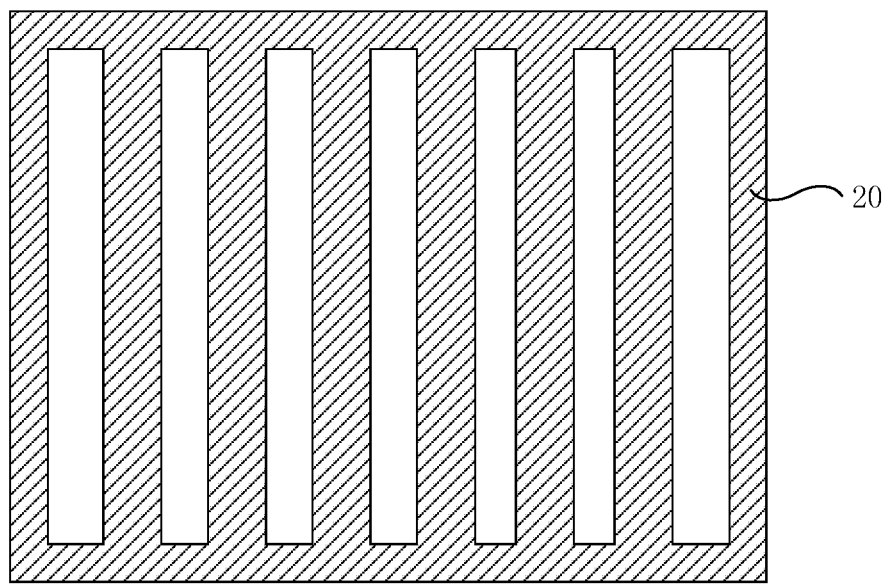
FIG. 1b is a structural schematic view of a wire grid polarizer.

In order to solve the above-described problem, a wire grid polarizer 20 made of a metal material is employed, as shown in FIG. 1*b*. In the case that light is incident on the wire grid polarizer 20, under an oscillatory action of free electrons on a surface of the metal wire grid polarizer 20, almost all light having an electric field vector component parallel to the wire grid is reflected, and almost all light having an electric field vector component perpendicular to the wire grid is transmitted. In addition, the light reflected by the wire grid polarizer 20 can be reused. Thus, the utilization of light is effectively improved.

Figure 2:
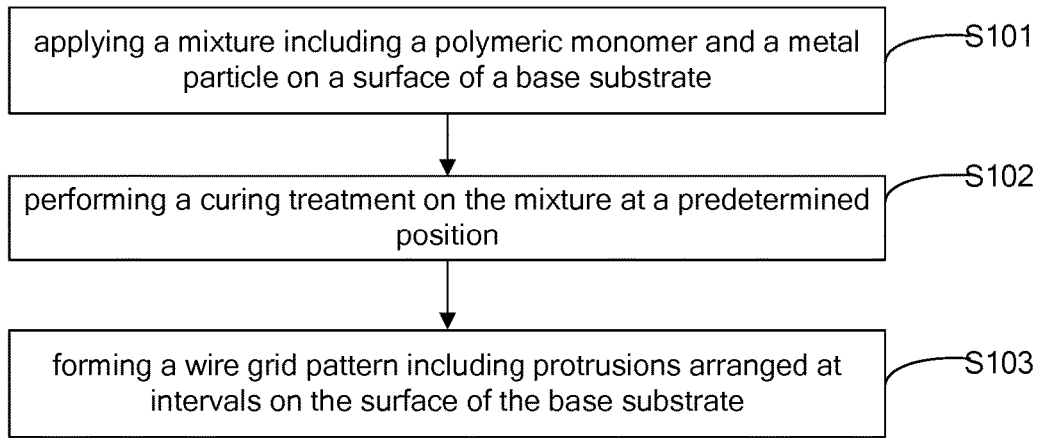
FIG. 2 is a flow chart of a fabrication method of a wire grid polarizer provided by embodiments of the present disclosure.

Embodiments of the present disclosure provide a fabrication method of a wire grid polarizer. As shown in FIG. 2, the method, for example, includes step S101 to step S103, which will be described below one by one.

Figure 4A:
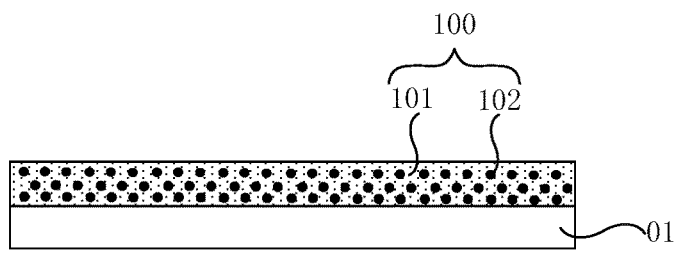
FIGS. 4a to 4c are structural schematic views in the fabrication process of the wire grid polarizer provided by the embodiments of the present disclosure.

Step S101: applying a mixture 100 including a polymeric monomer 101 and a metal particle 102 on a surface of a base substrate 01, as shown in FIG. 4*a*.

For example, the mixture 100 is coated on the surface of the base substrate 01.

For example, the base substrate 01 is formed by at least one of glass and quartz. For example, in the case that the wire grid polarizer is employed in a flexible display panel, the base substrate 01 is formed by at least one of polyethylene terephthalate (PET) and cellulose triacetate (TAC), to meet design requirements that the flexible display panel can be bent and convoluted.

Step S102: performing a curing treatment on the mixture 100 at a predetermined position.

Step S103: forming a wire grid pattern including protrusions 110 arranged at intervals on the surface of the base substrate 01.

The embodiments of the present disclosure are not limited to the sequence of the above-described steps. For example, the curing treatment on the mixture may be performed first, followed by forming the wire grid pattern; or, forming the wire grid pattern may be performed first, followed by the curing treatment.

The embodiments of the present disclosure provide the fabrication method of the wire grid polarizer, comprising: applying the mixture including the polymeric monomer and the metal particle on the surface of the base substrate; performing the curing treatment on the mixture at the predetermined position, so that the polymeric monomer at the predetermined position is cured; and forming the wire grid pattern including the protrusions arranged at intervals on the surface of the base substrate. For example, the cured mixture at the predetermined position is reserved on the base substrate, and substance at other positions is removed, so that the wire grid pattern including the protrusions arranged at intervals is formed on the surface of the base substrate. For example, each protrusion includes cured polymeric monomer and the metal particle encapsulated in the cured polymeric monomer. Thus, according to one aspect of the embodiments of the present disclosure, since the polymeric monomer is generally made of a resin material, it has a lower cost compared to a metal target material. According to another aspect of the embodiments of the present disclosure, since the above-described protrusions arranged at intervals have the metal particle, the incident light is polarized by utilizing an oscillation characteristic of the free electrons in the metal particle, so that the wire grid polarizer having a reflection characteristic is formed. According to still another aspect of the embodiments of the present disclosure, in the above-described process of fabricating the wire grid polarizer, compared to the case of using the metal target material, no metal deposition process and etching process is adopted, and thus, the fabrication process is simple, with low consumption of the metal material.

For example, the above-described polymeric monomer 101 includes an acrylic monomer, for example, at least one or a combination of several of methyl acrylate, ethyl acrylate, n-butyl acrylate, methyl methacrylate, and n-butyl methacrylate.

For example, the curing treatment according to the embodiments of the present disclosure refers to that, under actions of heat, pressure, a curing agent and/or ultraviolet light, the polymeric monomer 101 undergoes a chemical reaction and chemical bonds are generated between linear molecules of the polymeric monomer 101, so that the linear molecules are linked together to form a network structure, and the polymeric monomer 101 is cross-linked and cured to form an insoluble and infusible material. In the case that the above-described curing treatment is performed on the polymeric monomer formed of the acrylic monomer, an acrylic polymer is formed. The following embodiments of the present disclosure are illustrated with the curing treatment using an ultraviolet irradiation process as an example.

For example, the above-described metal particle includes at least one or a combination of several of an aluminum particle, an aluminum alloy particle, a copper particle and an iron particle. A conductive property of metal aluminum is stronger, so the metal aluminum contains more free electrons. The wire grid polarizer according to the embodiments of the present disclosure achieves the polarization of the incident light just by using the oscillation characteristic of the free electrons in the metal. Therefore, the metal particle according to the embodiments of the present disclosure preferably is the aluminum particle or the aluminum alloy particle.

For example, the wire grid polarizer 20 having the wire grid pattern needs to achieve the polarization of the incident light. In this case, for the protrusions 110 of the above-described wire grid pattern, a period T thereof (a distance between centers of two adjacent protrusions 110) needs to be less than or equal to a half of the wavelength of the incident light.

In addition, the above-described predetermined position is a position of the protrusions 110 to be formed, and the position of the protrusions 110 is related to the incident light. That is, the predetermined position is set according to the incident light. For example, in the case that the incident light is visible light, since the wavelength of the visible light is 400 to 800 nm, the period T of the protrusions 110 is less than or equal to 200 nm, and then the predetermined position is set according to the period T (i.e., the distance between the centers of the adjacent two protrusions 110)≤200 nm. For another example, in the case that the above-described wire grid polarizer is used in an infrared camera, since the wavelength of the infrared light as the incident light is 760 nm to 1 mm, the period T of the protrusions 110 is less than or equal to 380 nm, and then the predetermined position is set according to the period T≤380 nm.

On the premise that it is ensured that the wire grid polarizer works normally, the period T of the protrusions 110 is preferably as small as possible. However, the smaller the period T of the protrusions 110, the higher the fabrication accuracy, and the greater the processing difficulty. Thus, in overall consideration of the process difficulty and the polarization effect, the period T of the protrusions 110 according to the embodiments of the present disclosure is less than or equal to 100 nm.

The fabrication method of the above-described wire grid polarizer will be described in details with reference to specific examples below.

EXAMPLE ONE

Figure 3:
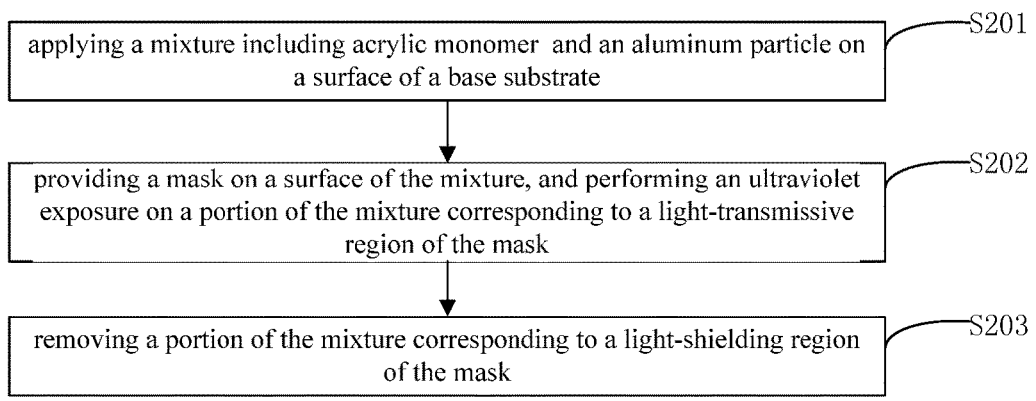
FIG. 3 is a flow chart of another fabrication method of the wire grid polarizer provided by the embodiments of the present disclosure.

S201: applying a mixture 100 of an acrylic monomer and an aluminum particle on a surface of a base substrate 01, as shown in FIG. 3 and FIG. 4a.

Figure 4B:
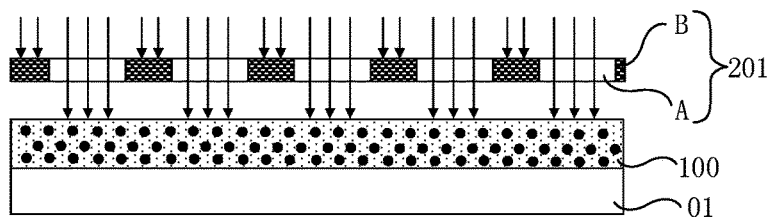

For example, a thickness of the mixture 100 ranges from 20 nm to 100 nm, including end values of 20 nm and 100 nm. In one aspect, in the case that the thickness of the mixture 100 is less than 20 nm, a height difference between the formed protrusion 110 and the base substrate 01 is too small, so that the fabricated wire grid polarizer may not polarize the incident light. In another aspect, in the case that the thickness of the mixture 100 is more than 100 nm, the thickness of the wire grid polarizer is too great, so that the prepared display device can not satisfy a trend of ultra-thinning S202: providing a mask 201 on a surface of the mixture 100, and performing an ultraviolet exposure on a portion of the mixture 100 corresponding to a light-transmissive region A of the mask 201, as shown in FIG. 4b.

For example, a width of the light-transmissive region A of the mask 201 is less than or equal to 50 nm. Thus, a width of the fabricated protrusion 110 is less than or equal to 50 nm, so that the polarization effect of the wire grid polarizer is better.

In addition, the mask 201 further includes a light-shielding region B that does not transmit light. Thus, as shielded by the light-shielding region B, a portion of the mixture 100 corresponding to the light-shielding region B is not cured by the ultraviolet exposure.

Figure 4C:
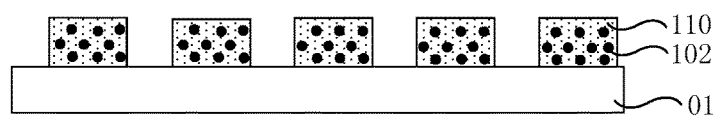

S203: removing the portion of the mixture 100 corresponding to the light-shielding region B of the mask 100, so as to form the wire grid pattern including the protrusions 110 arranged at intervals, as shown in FIG. 4c.

For example, the portion of the mixture 100 corresponding to the light-shielding region B of the mask 100 is not cured and still presents fluidity, so the substrate after completion of step S202 is washed with water.

EXAMPLE TWO

Figure 5:
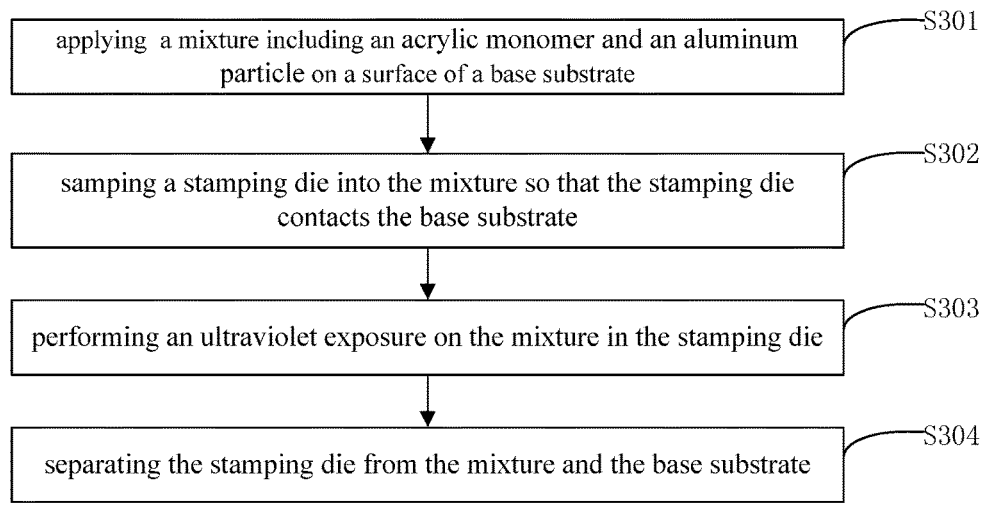
FIG. 5 is a flow chart of another fabrication method of the wire grid polarizer provided by the embodiments of the present disclosure.

S301: applying a mixture 100 (as shown in FIG. 4a) of an acrylic monomer and an aluminum particle on a surface of a base substrate 01, as shown in FIG. 5.

Figure 6:
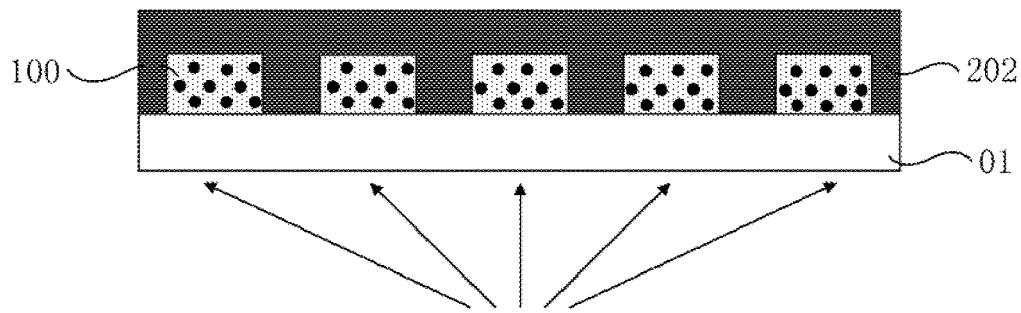
FIG. 6 is a structural schematic view in the fabrication process of the wire grid polarizer provided by the embodiments of the present disclosure.

For example, a thickness of the mixture 100 ranges from 20 nm to 100 nm, including end values of 20 nm and 100 nm. In one aspect, in the case that the thickness of the mixture 100 is less than 20 nm, a height difference between the formed protrusion 110 and the base substrate 01 is too small, so that the fabricated wire grid polarizer may not polarize the incident light. In another aspect, in the case that the thickness of the mixture 100 is more than 100 nm, the thickness of the wire grid polarizer is too great, so that the prepared display device can not satisfy a trend of ultra-thinning S302: stamping a stamping die 202 into the mixture 100 so that the stamping die 202 contact the base substrate 01, as shown in FIG. 6. In this way, the mixture 100 is filled into a groove of the stamping die 202.

For example, a width of the groove of the stamping die 202 is less than or equal to 50 nm. Thus, a width of the fabricated protrusion 110 is less than or equal to 50 nm, so that the polarization effect of the wire grid polarizer is better.

S303: performing an ultraviolet exposure on the mixture 100 in the stamping die 202.

For example, the stamping die 202 is made of a light-tight material, and in this case, as shown in FIG. 6, the ultraviolet exposure is performed on the mixture 100 in the groove of the stamping die 202 from a side of the base substrate 01 away from the stamping die 202.

Alternatively, for example, the above-described stamping die 202 is made of a transparent material. In this case, not only the exposure can be performed on the mixture 100 in the groove of the stamping die 202 from the side of the base substrate 01 away from the stamping die 202, but also a light source can be provided on an upper surface of the stamping die 202. In addition, since the stamping die 202 transmits light, light further enters into the stamping die 202 and penetrates a sidewall of the groove of the stamping die 202, to perform curing treatment on the mixture 100 located in the groove, so that a contact surface of the mixture 100 in the groove with ultraviolet light is increased, which reduces time for curing with ultraviolet light and improves production efficiency.

S304: separating the stamping die 202 from the mixture 100 and the base substrate 01 to form the wire grid pattern including the protrusions 110 arranged at intervals, as shown in FIG. 4c.

Compared to Example One, in Example Two, the mixture 100 between two adjacent protrusions 110 to be formed has been extruded in the stamping process, and thus it is not necessary to perform step S203 to remove the uncured mixture 100 in Example One, so that it is possible to avoid partial residue of the uncured mixture 100 due to a defect in the removing process in the case that the uncured mixture 100 is removed. However, in Embodiment Two, it is also necessary to clean the mixture 100 extruded during the stamping process to avoid contamination of the wire grid polarizer. Therefore, according to actual needs, the method for fabricating the wire grid polarizer is selected.

The above is only illustration of the fabrication process of the wire grid polarizer. Other fabrication methods will not be repeated one by one herein, which however should fall into the protection scope of the present disclosure.

Embodiments of the present disclosure provide a wire grid polarizer 20. As shown in FIG. 4C, the wire grid polarizer 20 comprises: a base substrate 01, and protrusions 110 arranged at intervals on a surface of the base substrate 01. In the embodiments of the present disclosure, the protrusion 110 includes a resin material doped with a metal particle 102.

For example, the resin material includes an acrylic polymer. The acrylic polymer for example is formed by polymerizing an acrylic monomer. The acrylic monomer for example includes at least one or a combination of several of methyl acrylate, ethyl acrylate, n-butyl acrylate and methyl methacrylate, and n-butyl methacrylate.

For example, the metal particle 102 includes at least one or a combination of several of an aluminum particle, an aluminum alloy particle, a copper particle and an iron particle. A conductive property of metal aluminum is stronger, so the metal aluminum contains more free electrons. The wire grid polarizer according to the embodiments of the present disclosure achieves the polarization of the incident light just by using the oscillation characteristic of the free electron in the metal. Therefore, the metal particle according to the embodiments of the present disclosure preferably is the aluminum particle or the aluminum alloy particle.

Embodiments of the present disclosure provide the wire grid polarizer, which comprises: the base substrate and protrusions arranged at intervals on the surface of the base substrate. The protrusion includes the resin material doped with the metal particle. In the way, in one aspect, compared to a metal target material, it has a lower cost; in another aspect, since the above-described protrusions arranged at intervals have the metal particles, by utilizing an oscillation characteristic of free electrons in the metal particle, the incident light is polarized, and the wire grid polarizer having a reflection characteristic is formed. Therefore, compared to use of the metal target material, the embodiments of the present disclosure lowers consumption of the metal material, so as to reduce the fabrication cost.

Embodiments of the present disclosure provide a display device, comprising any one of the wire grid polarizers as described above. The display device has a same advantageous effect as that of the wire grid polarizer according to the foregoing embodiments. Since the structure, the fabrication method and the advantageous effect of the wire grid polarizer have been described in detail in the foregoing embodiments, they will not be repeated here.

It should be noted that in the embodiments of the present disclosure, the display device, for example, at least comprises a liquid crystal display device and an organic light emitting diode display device; for example, the display device is any product or part having a display function such as a liquid crystal display, a liquid crystal television, a digital photo frame, a cell phone or a tablet personal computer and so on.

The foregoing embodiments merely are exemplary embodiments of the present disclosure, and not intended to define the scope of the present disclosure, and the scope of the present disclosure is determined by the appended claims.

The invention claimed is:

1. A fabrication method of a wire grid polarizer, comprising:

applying a mixture including a polymeric monomer and a metal particle on a surface of a base substrate;

performing a curing treatment on the mixture at a predetermined position; and forming a wire grid pattern including protrusions arranged at intervals on the surface of the base substrate.

2. The fabrication method of the wire grid polarizer according to claim 1, wherein after the applying the mixture including the polymeric monomer and the metal particle on the surface of the base substrate, the method further comprises:

providing a mask on a surface of the mixture, and exposing a portion of the mixture corresponding to a light-transmissive region of the mask; and removing a portion of the mixture corresponding to a light-shielding region of the mask.

3. The fabrication method of the wire grid polarizer according to claim 1, wherein after the applying the mixture including the polymeric monomer and the metal particle on the surface of the base substrate, the method further comprises:

stamping a stamping die into the mixture so that the stamping die contacts the base substrate;

irradiating the mixture in the stamping die; and separating the stamping die from the mixture and from the base substrate.

4. The fabrication method of the wire grid polarizer according to claim 3, wherein, the stamping die is made of a transparent material.

5. The fabrication method of the wire grid polarizer according to claim 1, wherein, the polymeric monomer includes an acrylic monomer.

6. The fabrication method of the wire grid polarizer according to claim 1, wherein, the metal particle includes at least one or a combination of several of an aluminum particle, an aluminum alloy particle, a copper particle and an iron particle.

7. The fabrication method of the wire grid polarizer according to claim 1, wherein, a period of the protrusions is less than or equal to a half of a wavelength of an incident light, and the period is a distance between centers of two adjacent protrusions.

8. The fabrication method of the wire grid polarizer according to claim 7, wherein, the period of the protrusion is less than or equal to 100 nm.

9. The fabrication method of the wire grid polarizer according to claim 1, wherein, a width of the protrusion is less than or equal to 50 nm.

10. The fabrication method of the wire grid polarizer according to claim 1, wherein, a thickness of the protrusion is 20 nm to 100 nm.

11. The fabrication method of the wire grid polarizer according to claim 1, wherein, a material constituting the base substrate includes at least one of glass and quartz, or at least one of polyethylene terephthalate and cellulose triacetate.

* * * * *